United States Patent
Sears et al.

(10) Patent No.: US 7,221,110 B2
(45) Date of Patent: May 22, 2007

(54) LIGHTING CONTROL SYSTEM AND METHOD

(75) Inventors: Storm S. Sears, Dayton, NV (US); John Martinelli, Minden, NV (US)

(73) Assignee: Bruce Industries, Inc., Dayton, NV (US)

( * ) Notice: Subject to any disclaimer, the term of this patent is extended or adjusted under 35 U.S.C. 154(b) by 113 days.

(21) Appl. No.: 11/015,184

(22) Filed: Dec. 17, 2004

(65) Prior Publication Data

US 2006/0132065 A1  Jun. 22, 2006

(51) Int. Cl.
*H05B 37/00* (2006.01)

(52) U.S. Cl. .................. 315/312; 315/317; 315/318; 315/297; 315/362

(58) Field of Classification Search ............... 315/312, 315/297, 317, 318, 362, 291–295, 324; 700/19–21; 719/318, 320, 328; 362/545
See application file for complete search history.

(56) References Cited

U.S. PATENT DOCUMENTS

| | | | |
|---|---|---|---|
| 4,501,994 A | 2/1985 | Spreadbury | |
| 4,733,138 A | 3/1988 | Pearlman et al. | |
| 5,059,871 A | 10/1991 | Pearlman et al. | |
| 5,329,431 A * | 7/1994 | Taylor et al. | 362/85 |
| 5,504,398 A | 4/1996 | Rothenbuhler | |
| 5,539,284 A | 7/1996 | Stone | |
| 5,652,481 A | 7/1997 | Johnson et al. | |
| 5,677,603 A | 10/1997 | Speirs et al. | |
| 5,811,942 A | 9/1998 | Pedretti | |
| 6,297,724 B1 * | 10/2001 | Bryans et al. | 340/3.51 |
| 6,486,615 B2 | 11/2002 | Hui et al. | |
| 6,608,453 B2 * | 8/2003 | Morgan et al. | 315/312 |
| 6,639,368 B2 | 10/2003 | Sheoghong | |
| 2004/0160199 A1 * | 8/2004 | Morgan et al. | 315/312 |
| 2005/0111231 A1 * | 5/2005 | Crodian et al. | 362/545 |

* cited by examiner

Primary Examiner—Haissa Philogene
(74) Attorney, Agent, or Firm—Brooks Kushman P.C.

(57) ABSTRACT

A lighting control system includes a plurality of light controllers. Each light controller contains a microprocessor-based intelligence. The plurality of light controllers form a distributed architecture. The microprocessor-based intelligence is operative to store, calculate, and execute complex lighting scenarios. The microprocessor-based intelligence executes a lighting control script during operation. The lighting control script is sufficiently detailed and the light controller is sufficiently intelligent so as to allow the light controller to control lighting without the necessity of a having a present external control architecture.

16 Claims, 5 Drawing Sheets

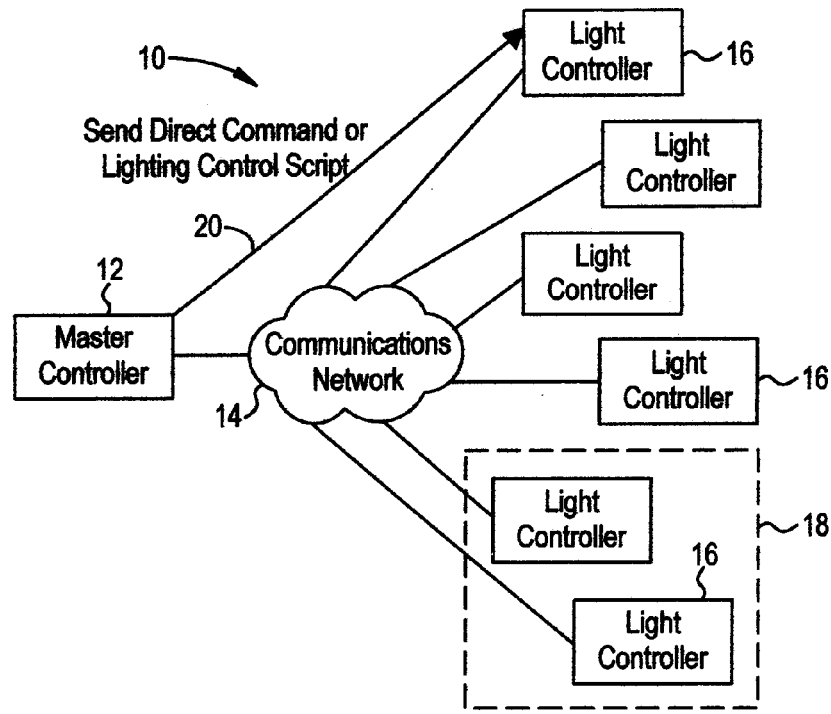
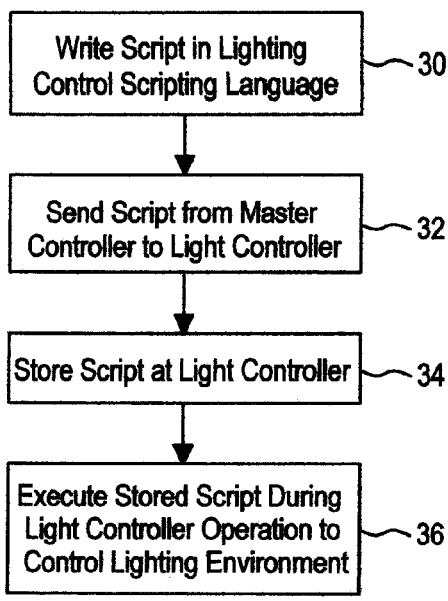
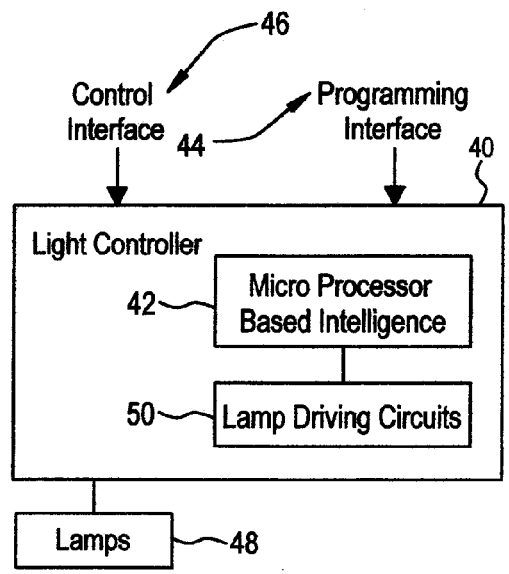
FIG. 1
FIG. 2
FIG. 3

LIGHTING CONTROL SYSTEM AND METHOD

BACKGROUND OF THE INVENTION

1. Field of the Invention

The invention relates to lighting systems, programmable lighting controllers, and lighting fixtures including flourescent lamp ballasts and light emitting diode (LED) power sources.

2. Background Art

An existing lighting system includes a number of lighting fixtures and a controller in the form of a host computer. The host computer sends individual commands to each lighting fixture over a communication network. One problem in such a system is that a bottleneck in the communications may occur as lights are turned on and brightness is adjusted. Another problem in such a system is the failure of the system to operate when the host computer is disconnected.

In another existing arrangement, programmable lighting circuit controllers have been used in certain applications where a wall-mounted controller controls a plurality of household lighting circuits. These controllers have limited capabilities, and have only been used in certain applications.

Background information may be found in U.S. Pat. Nos. 4,501,994, 4,733,138, 5,059,871, 5,504,398, 5,539,284, 5,652,481, 5,677,603, 5,811,942, 6,639,368, and 6,486,615.

For the foregoing reasons, there is a need for improved lighting control system and method.

SUMMARY OF THE INVENTION

It is an object of the invention to provide an improved lighting control system and method wherein the fluorescent ballast, lighting controller, or power supply contains a microprocessor-based intelligence that allows the device to independently store, calculate, and execute complex lighting scenarios without the necessity for any type of external control architecture. This allows the system to be retrofit into existing lighting applications without the need for expensive platform or architectural reconfiguration. In this way, the system may provide a cost-effective solution for the retrofit or new installation of lighting systems, where dimming or mood lighting effects are desired. That is, the invention contemplates a distributed architecture.

A lighting system according to the invention includes a collection of light controllers. A light controller may be embodied as a light fixture. A light controller contains a microprocessor-based intelligence such that the collection of light controllers form a distributed architecture. The microprocessor-based intelligence is operative to store, calculate, and execute complex lighting scenarios without the necessity for any type of external control architecture.

Preferably, the microprocessor-based intelligence executes a script corresponding to the desired lighting scenario that directs the control of the lighting. The script is written in a lighting control scripting language that is a full-featured scripting language such that a script may direct the light controller and provide detailed control over the lighting environment.

At a more detailed level, the inclusion of a microprocessor-based intelligence within each lighting controller, relieves the control communication network of the necessity for continuous communication. Each lighting controller on the network only requires infrequent command scripts in order to execute complex lighting scenarios. According to this aspect of the invention, in the absence of any type of external control communications, each lighting controller in the system can continue to run its own script and control its own lamp or lamps. In this way, it is possible to overcome problems associated with communication bottlenecks an host disconnects. This also makes it possible to implement a number of different control strategies for the lighting controller, other than a serial communications bus control method.

Put another way, each light controller may independently store, calculate, and execute complex lighting scenarios without the necessity for any type of external control architecture due to the distributed architecture approach contemplated by the invention.

The invention further comprehends several additional aspects. In one additional aspect, at the highest level of a local system is a master controller. Below the master controller there may be a number of zones and within each zone there may be a number of light controllers. Each light controller may control one or more lamps. The master controller contains communications software operable to allow communication with the individual light controllers. In this way, the master controller may use the communications software to issue direct commands to all light controllers in a particular zone or to any individual light controller. The master controller may also use the communications software to download a lighting scheme in the form of a script to any individual light controller or group of light controllers. Preferably, the master controller contains software operable to provide a lighting scheme editor and a lighting scheme compiler to provide full support at, the master controller for the scripting language.

According to the invention, each light controller has the ability to be configured by receiving and storing a lighting scheme. In a particular implementation, configuration parameters include the zone of the lamp, the unit within a zone, the color of light being controlled as well as hardware related parameters such as current or voltage for 100% brightness, current or voltage for the off condition, maximum operating temperature, and others. Each lamp should have a unique identifier or hardware address. These identifiers may be provided during manufacturing in any suitable fashion.

In a preferred embodiment, each light controller has the ability to be controlled by commands issued from the master controller or controlled via the execution of a previously downloaded lighting script. Each light controller may also have inputs to signify on/off, brightness, and other lighting related signals.

BRIEF DESCRIPTION OF THE DRAWINGS

FIG. 1 illustrates a lighting system in accordance with the invention;

FIG. 2 is a block diagram illustrating a method in accordance with the invention;

FIG. 3 illustrates a light controller in greater detail;

DETAILED DESCRIPTION OF THE PREFERRED EMBODIMENTS

Figure 4:
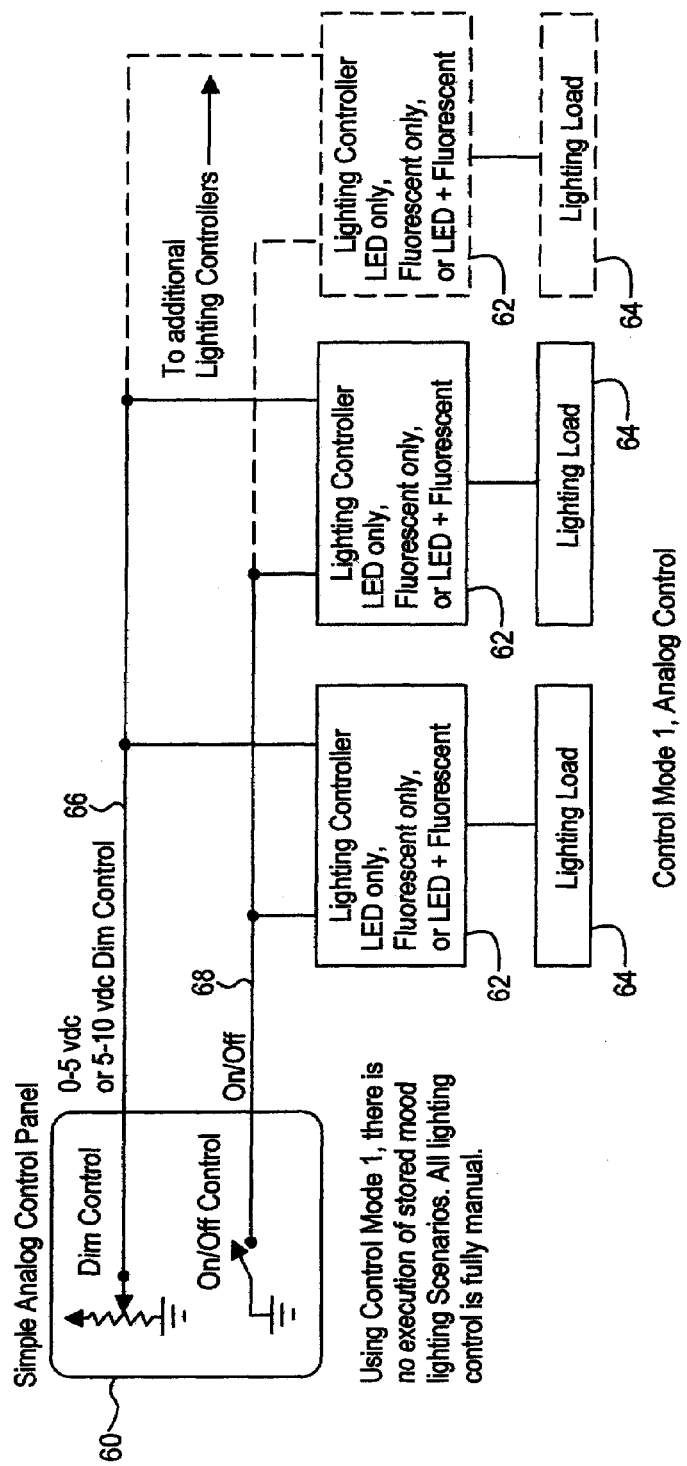
FIG. 4 illustrates a first control mode for a light controller according to the invention.

With reference to FIG. 1, a lighting system is generally indicated at 10. Lighting system 10 includes a master controller 12, a communications network 14, and a plurality of light controllers 16. As shown, several light controllers 16 may be grouped within a zone 18. Master controller 12 is operative to send a script to a light controller using communications network 14. Arrow 20 indicates master controller 12 sending a lighting control script to a light controller. In the alternative, master controller 12 may issue direct commands to light controllers. The light controller receiving the script stores the script in memory, and executes the stored script during operation. The lighting control script directs the control of the lighting.

Each light controller 16 includes a microprocessor-based intelligence that allows the device to independently store, calculate, and execute complex lighting scenarios without the necessity for any type of external control architecture. That is, the light controllers form a distributed architecture.

With reference to FIGS. 1 and 2, in accordance with a lighting control method, a script is written in a lighting control scripting language (block 30). The script is then sent from master controller 12 to one of the light controllers 16 (block 32).

The lighting control scripting language is a full-featured scripting language. In this way, a script may direct a light controller and provide detailed control over the lighting environment. In the illustrated embodiment, each light controller 16 is sent a script (for example, arrow 20) which defines that light controller's operation within the overall lighting scheme. Each light controller 16 receiving a script stores the script in memory (block 34).

Each light controller 16 executes the stored script during light controller operation to control the lighting environment (block 36). In this way, even in the absence of any type of external control communications, each light controller 16 in the system 10 can continue to run its own script and control its own lamp or lamps.

As best shown in FIG. 1, in the illustrated embodiment, the highest level of the local system is master controller 12. Below master controller 12, there may be a number of zones such as illustrated zone 18. A zone may contain a plurality of light controllers with each light controller controlling one or more lamps. In this way, the communications software at master controller 12 allows communication with the light controllers to allow the issuance of direct commands or the downloading of a lighting scheme in the form of a script to any individual lighting controller/fixture or a group of lighting controllers/fixtures.

An exemplary application of the invention may consist of a master controller on each floor of a building. On a particular floor, each room may be considered a zone. Within each room, multiple light controllers may be installed. The concept of a zone is a logical collection of lighting controllers that are associated in a close proximity.

According to a preferred embodiment of the invention, the lighting control scripting language includes all necessary commands to allow the blending and mixing of lighting conditions to create or enhance an environment. The language also preferably contains extensions to allow input from sensors and have program control changes based on external inputs. Further, it is preferred that the language and communications scheme support built-in test and fault detection to enhance maintenance of the system. A preferred implementation of the lighting control scripting language supports polling to allow roll call of all devices with each device having a unique identification to allow for some level of plug and play capability.

FIG. 3 illustrates an exemplary light controller in greater detail at 40. According to the invention, each light controller contains intelligence. Light controller 40 includes microprocessor-based intelligence 42 which contains the necessary software to provide control over lamp 48. For enhanced lamp control according to the invention, microprocessor-based intelligence 42 includes non-volatile memory that is used to store lighting scripts. It is appreciated that the intelligent light controller can independently store, calculate, and execute complex lighting scenarios without the necessity for any type of external control architecture. These concepts may be implemented in any suitable way. As shown, light controller 40 further includes programming interface 44 and control interface 46. According to the invention, lighting control scripts are stored in non-volatile memory. Programming interface 44 is utilized to carry out this process. A stored script directs the control of the lighting. Preferably, the scripting language supports the ability to modify the lighting conditions in response to external events from sensors and light controller 40 has inputs to signify on/off, brightness, and other lighting related signals. All of these inputs are generally indicated by control interface 46. As well, direct commands may be received through a control interface 46.

Advantageously, embodiments of the invention allow the storing of pre-programmed mood lighting scenario information within an intelligent lighting control ballast or power supply. This allows installation in a platform, without any re-wiring of that platform, and provides sophisticated lighting scenarios.

In an exemplary implementation, fluorescent lamp ballasts and LED power sources will be equipped with a PIC microcontroller containing a minimum of 64 kB of non-volatile EEPROM memory which can be re-programmed via a serial interface. This non-volatile memory will be used to contain tables of mood lighting scenario data. This scenario data can then be executed via simple external control signals or serial commands. The scenario data takes the form of one or more scripts.

Figure 5:
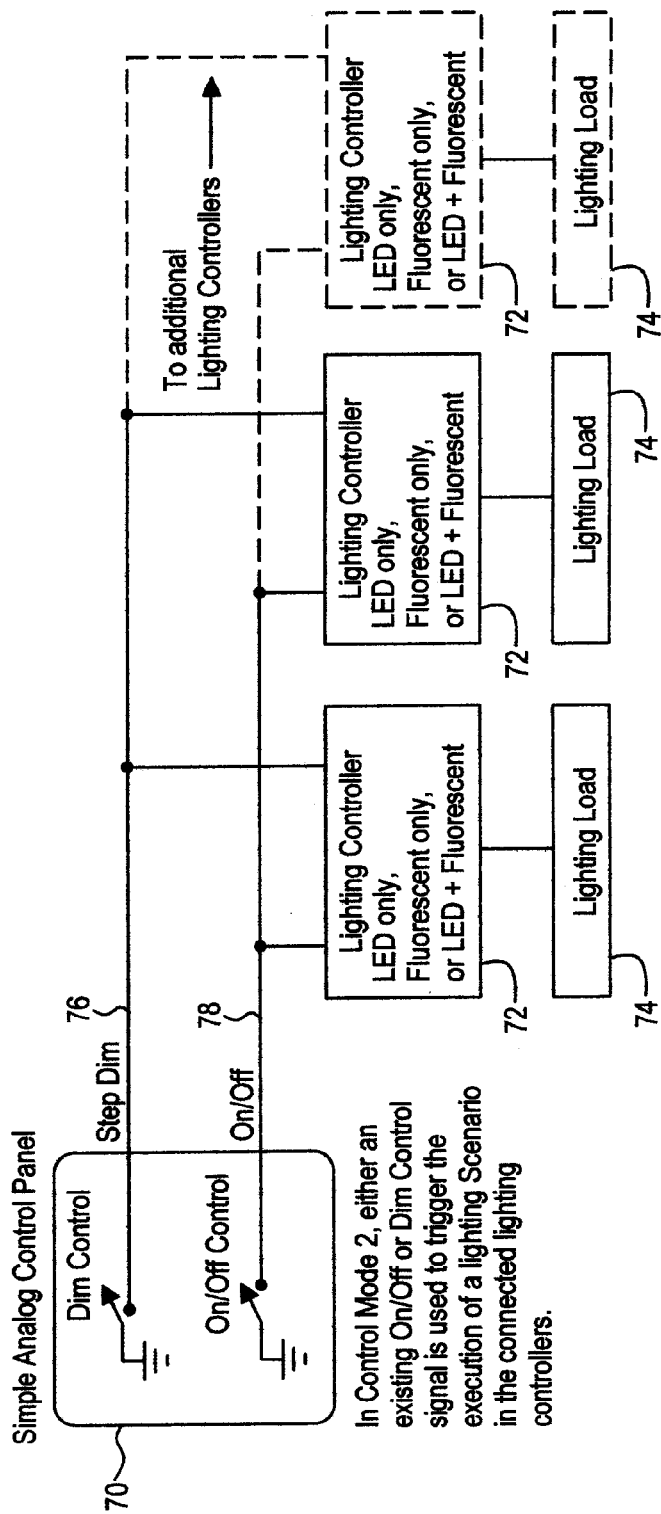
FIG. 5 illustrates a second control mode for a light controller according to the invention.
Figure 6:
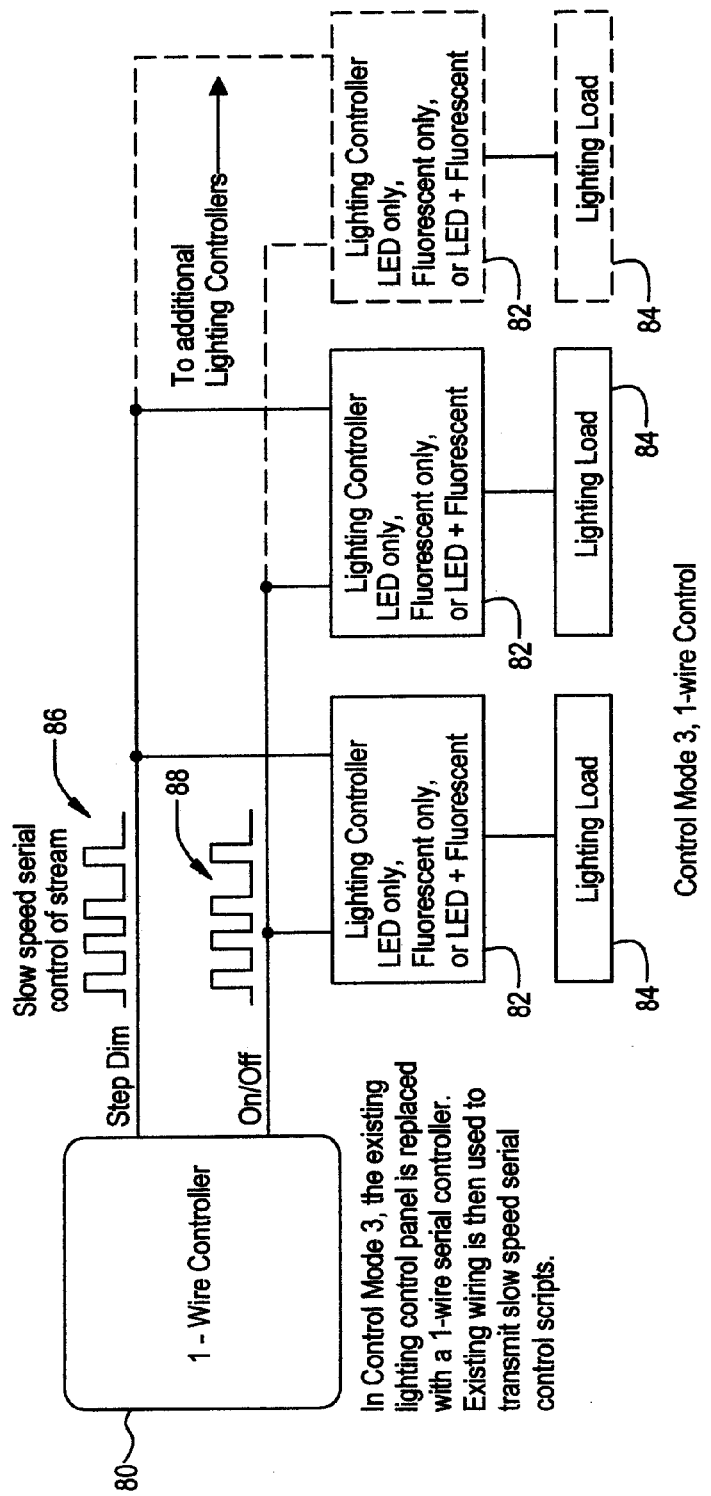
FIG. 6 illustrates a third control mode for a light controller according to the invention.
Figure 7:
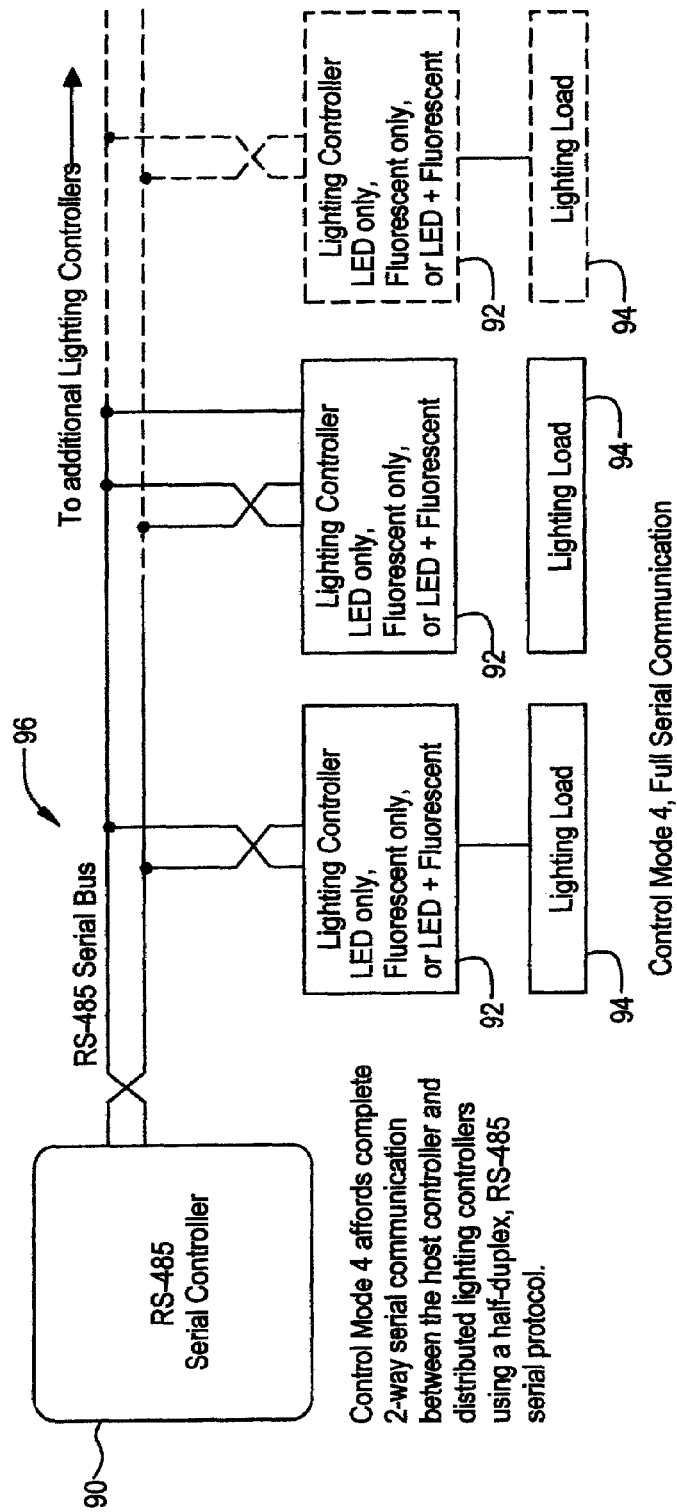
FIG. 7 illustrates a fourth control mode for a light controller according to the invention.

Further, in the exemplary implementation, four tiers of control implementation will be available with each ballast or power supply, depending on the customer's needs and the desired complexity of the installation. Contemplated control implementations include the following:

a) Control Mode 1, Analog Control (FIG. 4)—This control mode does not make use of scenario data stored within the ballast or power supply. Control of lighting amplitude is achieved via an external controller which provides a variable analog voltage of 0–5 VDC or 5–10 VDC. In addition to the dim control signal, there is a digital on/off control signal. In FIG. 4, simple analog control panel 60 provides dim control signal 66 and on/off control signal 68. Lighting controllers and lighting loads are indicated at 62 and 64, respectively.

b) Control Mode 2 (FIG. 5)—In this control mode, existing on/off or dim control signals will be used to initiate a single, pre-programmed scenario sequence. For example, the power supply is commanded to the "ON" condition. The power supply over a period of time, brings the amplitude of the lighting from 0% to 100% (e.g. 10 minutes). Next, the power supply is commanded to the "OFF" condition. The power supply then brings the amplitude of the lighting from 100% to 0% over a period of time (e.g. 1 minute). In FIG. 5, simple analog control panel 70 provides dim control signal 76 or on/off control signal 78 to initiate a single, pre-programmed scenario sequence. Lighting controllers and lighting loads are indicated at 72 and 74, respectively.

c) Control Mode 3 (FIG. 6)—In this control mode, existing on/off or dim control signal lines will be used to implement a very low speed, one-wire serial interface. The control console for the platform; an on/off switch and a dim switch, is replaced with a simple control panel which emits low baud rate serial data streams when operator control buttons are pushed. Operator control buttons would include such features as:

(1) Manual dim control
(2) Zone command control
(3) Scenario selection
(4) Scenario start and stop
(5) Pause and Resume
(6) On and Off This mode of control allows fairly elaborate mood lighting control sequences to be initiated with an extremely simple, low cost, control device. This mode of control can also be retrofitted to a platform with virtually no costly re-wiring. In FIG. 6, one-wire controller 80 provides a serial control stream over the on/off or dim control signal line 86 and 88, respectively. Lighting controllers and lighting loads are indicated at 82 and 84, respectively.

d) Control Mode 4/Full Serial Control (FIG. 7)—In this control mode, ballast or power supply control is via an RS-485, half-duplex, serial link. This control mode allows for full control of pre-programmed mood lighting scenarios, power supply status monitoring, and re-programming of mood lighting sequence data. Control is via a dedicated control device, or a PC based controller running a GUI program. This control mode requires the platform to be fitted with suitable serial cabling. In FIG. 7, RS-485 serial controller 90 provides signals over bus 96. Lighting controllers and lighting loads are indicated at 92 and 94, respectively.

Each ballast or power supply, in preferred embodiments, will contain a real time clock (RTC) device with power failure backup. This timing device will be used to re-synchronize multiple power supplies executing a mood lighting scenario in the event of a momentary power interruption. This is particularly important in the case of Control Modes 2 and 3.

It is appreciated the multiple control interface architecture is made possible by the fact that each light controller contains intelligence, forming a distributed architecture. In this way, more sophisticated approaches such as Control Mode 3 and Control Mode 4 only require that brief, infrequent command scripts need to be sent to the distributed nodes to initiate complex lighting control scenarios.

It is appreciated that a particular advantage of Control Mode 3 is that existing platform or architectural wiring may be used, reducing implementation costs and accelerating the retrofit process. The Control Mode 3 architecture forms an intermediate lighting control solution between the simple hardware control strategy (Control Mode 2) and the full serial control strategy (Control Mode 4). Using the Control Mode 3 strategy, a large variety of lighting scenarios can be selected from a simple control panel. By contrast, using Control Mode 2, a limited number of lighting scenarios can be initiated using existing dim control or on/off control lines.

In the one-wire interface approach (Control Mode 3), there is the possibility that lighting nodes (fluorescent ballast, LED controllers, etc.) could potentially become unsynchronized from one another in the event of a momentary power interruption. This situation is addressed by providing a power-fail realtime clock (RTC) device as a part of the distributed microprocessor control architecture. In the event of a transient or power interruption during scenario execution, the power-fail RTC device will provide a method whereby each of the individual nodes can be resynchronized to the existing scenario execution, without starting over at the beginning of the script or at a random point in execution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A lighting control system comprising:
a plurality of light controllers, each light controller containing a microprocessor-based intelligence such that the plurality of light controllers form a distributed architecture, the microprocessor-based intelligence being operative to store, calculate, and execute complex lighting scenarios,
wherein each light controller is configured with a lighting control script and the microprocessor-based intelligence executes the lighting control script during operation, whereby the lighting control script directs the control of the lighting, wherein the lighting control script is sufficiently detailed and the light controller is sufficiently intelligent so as to allow the light controller to control lighting without the necessity of having a present external control architecture wherein each light controller includes a power-fail safe real time clock (RTC) device for allowing resynchronization of the plurality of light controllers to an existing scenario execution.

2. The system of claim 1 wherein at least one of the light controllers includes a fluorescent lamp ballast.

3. The system of claim 1 wherein at least one of the light controllers includes a light emitting diode (LED) power source.

4. The system of claim 1 wherein the plurality of light controllers are configured so as to collectively control lighting over a wide area in accordance with a desired lighting scenario.

5. The system of claim 1 wherein each light controller has a hardware address provided during manufacturing.

6. The system of claim 1 wherein each light controller includes at least one signal input, wherein the light controller supports the modification of the lighting conditions in response to external events as determined from the at least one signal input.

7. A lighting control method comprising:
providing a plurality of light controllers, each light controller containing a microprocessor-based intelligence such that the plurality of light controllers form a distributed architecture, the microprocessor-based intelligence being operative to store, calculate, and execute complex lighting scenarios,
wherein each light controller is configured with a lighting control script and the microprocessor-based intelligence executes the lighting control script during operation, whereby the lighting control script directs the control of the lighting, wherein the lighting control script is sufficiently detailed and the light controller is sufficiently intelligent so as to allow the light controller to control lighting without the necessity of having a present external control architecture wherein each light controller includes a power-fail safe real time clock (RTC) device for allowing resynchronization of the plurality of light controllers to an existing scenario execution.

8. The method of claim 7 further comprising:
controlling a selected light controller, including commanding the selected light controller via a multi-wire serial link.

9. The method of claim 7 further comprising:
configuring the plurality of light controllers so as to collectively control lighting over a wide area in accordance with a desired lighting scenario.

10. The method of claim 9 further comprising:
providing a master controller;
providing a communications network providing a communication path between the master controller and the plurality of light controllers; and
sending a lighting control script from the master controller to a selected light controller, the lighting control script defining light controller operation within an overall lighting scheme.

11. The method of claim 10 further comprising:
sending a direct command from the master controller to the selected light controller.

12. The method of claim 10 further comprising:
designating a group of light controllers as a zone; and
sending the lighting control script from the master controller to each light controller in the group designated as the zone.

13. The method of claim 10 further comprising:
designating a group of light controllers as a zone; and
sending a direct command from the master controller to each light controller in the group designated as the zone.

14. The method of claim 10 wherein the master controller contains software operable to provide a lighting scheme editor and a lighting scheme compiler.

15. The method of claim 7 further comprising:
controlling a selected light controller wherein the selected light controller is programmed for a scenario sequence, including commanding the selected light controller to the "on" condition via a digital control input to initiate the scenario sequence.

16. The method of claim 7 further comprising:
controlling a selected light controller, including commanding the selected light controller via a one-wire serial interface.

* * * * *